United States Patent
Van Der Ven

(10) Patent No.: US 10,221,988 B2
(45) Date of Patent: Mar. 5, 2019

(54) CHANNELED TUBE INSPECTION DEVICE

(71) Applicant: V-TECH BV, Eindhoven (NL)

(72) Inventor: Vincentius Johannes Marianus Van Der Ven, Eindhoven (NL)

(73) Assignee: V-TECH BV, Waalre (NL)

( * ) Notice: Subject to any disclaimer, the term of this patent is extended or adjusted under 35 U.S.C. 154(b) by 149 days.

(21) Appl. No.: 15/308,463

(22) PCT Filed: May 4, 2015

(86) PCT No.: PCT/NL2015/050310
§ 371 (c)(1),
(2) Date: Nov. 2, 2016

(87) PCT Pub. No.: WO2015/170976
PCT Pub. Date: Nov. 12, 2015

(65) Prior Publication Data
US 2017/0067592 A1  Mar. 9, 2017

(30) Foreign Application Priority Data
May 3, 2014 (NL) ..................................... 2012752

(51) Int. Cl.
*G01D 11/30* (2006.01)
*F16L 55/40* (2006.01)
(Continued)

(52) U.S. Cl.
CPC ................ *F16L 55/40* (2013.01); *E03F 7/12* (2013.01); *F16L 55/30* (2013.01)

(58) Field of Classification Search
CPC ...... G01D 11/30; G01D 11/245; G01D 11/24; G01N 29/225; G01N 29/265; F16L 55/40; F16L 55/30
(Continued)

(56) References Cited

U.S. PATENT DOCUMENTS 1,751,415 A * 3/1930 McCaffrey .............. E03C 1/302
15/104.33
1,863,460 A * 6/1932 Auringer ................. E03C 1/302
15/104.33
(Continued)

FOREIGN PATENT DOCUMENTS

DE  20 2013 007512 U1  9/2013
WO     2014/182737 A1  11/2014

OTHER PUBLICATIONS

International Search Report, dated Oct. 6, 2015, from corresponding PCT application.

*Primary Examiner* — Eric S McCall
*Assistant Examiner* — Mohammed E Keramet-Amircola
(74) *Attorney, Agent, or Firm* — Young & Thompson

(57) ABSTRACT

A channel tube inspection device 1 includes an inspection head 3, a pushing cable 5 and an elongated intermediate part 7 whose one end 7a is connected to the inspection head and whose other end 7b is connected to the pushing cable. The intermediate part 7 has a radial rigidity or, worded differently, bending rigidity gradually increasing over its length. The bending rigidity of the intermediate part 7 gradually increases from the inspection head 3 to the pushing cable 6. The intermediate part 7 is solid and has a gradually diminishing diameter from the pushing cable 5 to the inspection head 3. The intermediate part 7 is made of plastic, preferably PUR.

9 Claims, 1 Drawing Sheet

Figure 1:
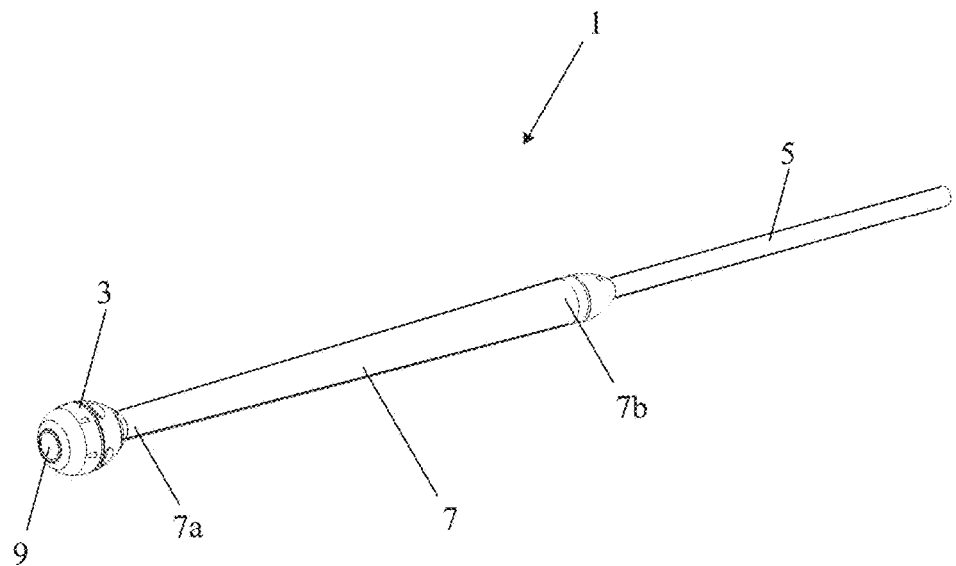

(51) Int. Cl.
*E03F 7/12* (2006.01)
*F16L 55/30* (2006.01)

(58) Field of Classification Search
USPC ........................................................ 73/866.5
See application file for complete search history.

(56) References Cited

U.S. PATENT DOCUMENTS

| | | | | |
|---|---|---|---|---|
| 4,246,604 A * | 1/1981 | Hundertmark | ............ | E03F 7/12 |
| | | | | 348/373 |
| RE33,160 E * | 2/1990 | Guthrie | .................... | E03F 7/12 |
| | | | | 348/84 |
| 5,457,288 A * | 10/1995 | Olsson | .................. | H01B 7/183 |
| | | | | 174/105 R |
| 8,984,698 B1 * | 3/2015 | Olsson | .................. | B08B 9/045 |
| | | | | 15/104.03 |
| 9,829,783 B1 * | 11/2017 | Chapman | .................. | F16C 1/10 |
| 2002/0166396 A1 * | 11/2002 | McGrew | ............... | G01M 3/005 |
| | | | | 73/865.8 |
| 2003/0142207 A1 * | 7/2003 | Olsson | .................. | H04N 7/185 |
| | | | | 348/84 |
| 2004/0083829 A1 * | 5/2004 | Chapman | ................ | F16L 55/26 |
| | | | | 73/865.8 |
| 2005/0115338 A1 * | 6/2005 | McGrew | .................. | E03F 3/06 |
| | | | | 73/865.8 |
| 2007/0297778 A1 * | 12/2007 | Lange | ................. | G03B 37/005 |
| | | | | 396/19 |
| 2009/0038093 A1 * | 2/2009 | Irwin | .................... | B08B 9/0436 |
| | | | | 15/104.095 |
| 2010/0208055 A1 * | 8/2010 | Olsson | .................. | H01B 7/182 |
| | | | | 348/84 |

* cited by examiner

CHANNELED TUBE INSPECTION DEVICE

FIELD OF THE INVENTION

The invention relates to a channel tube inspection device comprising an inspection head, a pushing cable, and an elongated intermediate part of which one end is connected to the inspection head and the other end is connected to the pushing cable, which intermediate part comprises elastically bendable portions which has a different elasticity.

STATE OF THE ART

A channel tube inspection device is known from DE 20 2013 007 512 U. This known channel tube inspection device comprises various homogeneous elongated parts which have a different elasticity and hence also a different bending rigidity. The rigidity shows a decrease in steps from the inspection head to the pushing cable. It has turned out that with this known inspection device it is relatively hard to push the inspection device through a bend.

The known channel inspection device shows at least a leap of radial rigidity and also between the intermediate part and the pushing cable there is a leap of radial rigidity. As a result, the channel tube inspection device poorly negotiates the bend or cannot negotiate the bend at all where the leap of rigidity is found.

In many cases a spring is installed between the head and the push cable. This spring is relatively weak for having the head negotiate the bend. The pushing cable is relatively stiff for pushing the unit sufficiently far. In the case of particularly sharp bends and/or relatively small diameters this causes problems. The pushing cable does not succeed in negotiating the bend. The weak part that has already negotiated the bend cannot sufficiently bend the stiffer second part in the right direction for pushing this stiffer second part through the bend. One pushes then too much almost perpendicularly to the wall of the bend as a result of which one does not get any farther.

SUMMARY OF THE INVENTION

It is an object of the invention to provide a channel tube inspection device of the type defined in the opening paragraph which allows of changing direction in an easy fashion, or worded differently, where the inspection head can be pushed through a bend in a simpler fashion. For this purpose the channel tube inspection device according to the invention is characterized in that the intermediate part possesses a bending rigidity gradually increasing over its length, where the bending rigidity of the intermediate part gradually increases from the inspection head to the pushing cable. Bending rigidity is also referred to as radial rigidity.

The intermediate part between the inspection head and the pushing cable starts relatively slack and ends having the same radial rigidity as the pushing cable. As a result of the relatively slack front part, seen in pushing direction, the inspection head negotiates a bend well. Because of the gradually increasing rigidity, the part that has already been pushed through the bend is capable of bringing the part that still has to be pushed through the bend to a state (optimum orientation) in which it can be pushed well through the bend. Since there are no leaps in the course of the radial rigidity, it is the entire length of the intermediate part that is concerned when the part to be pushed through the bend is to be brought to the right state. As a result, the whole negotiates the bends as smoothly as possible.

An advantageous embodiment of the channel tube inspection device according to the invention is characterized in that the intermediate part is substantially solid and has a gradually diminishing diameter from the pushing cable to the inspection head. In this manner a gradually diminishing bending rigidity can be simply created. Substantially solid in this context is to be understood as being a solid intermediate part which is provided with an opening (channel) that extends over the total length for feeding through cables for the operation and signal transmission of the inspection head.

The intermediate part is preferably made of plastic, preferably PUR. It has turned out that PUR has pre-eminent properties for this objective.

BRIEF DESCRIPTION OF THE DRAWING FIGURES

Figure 2:
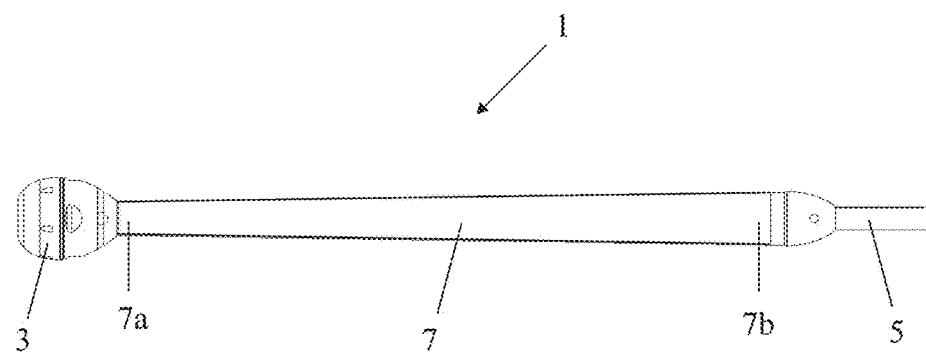

The invention will be further described below in more detail with reference to an example of embodiment represented in the drawings of the channel tube inspection device according to the invention, in which drawings:

FIG. 1 shows in a perspective view an embodiment of the channel tube inspection device according to the invention; and FIG. 2 shows in a side view the channel tube inspection device shown in FIG. 1.

DETAILED DESCRIPTION OF THE DRAWING FIGURES

FIGS. 1 and 2 show an embodiment of the channel tube inspection device according to the invention in a perspective view and side view respectively. The channel tube inspection device 1 comprises and inspection head 3, a pushing cable 5 and an elongated intermediate part 7. The intermediate part is connected with an end 7a to the inspection head and with its other end 7b to the pushing cable. The inspection head 3 is equipped with a camera 9.

The intermediate part 7 has a radial rigidity also referred to as bending rigidity gradually increasing over its length. The bending rigidity of the intermediate part 7 gradually increases from the inspection head 3 to the pushing cable 5. In the embodiment shown the intermediate part 7 is solid with the exception of a central opening which extends over the entire length of the intermediate part for feeding through cables for the operation and signal transmission to and from the inspection head. The intermediate part 7 has a gradually diminishing diameter from the pushing cable 5 to the inspection head 3 and is made of plastic, for example PUR.

Albeit the invention described above has been described in the foregoing with reference to the drawings, it should be established that the invention is not by any manner or means restricted to the embodiment shown in the drawings. The invention also extends to any embodiments deviating from the embodiment shown in the drawings within the framework defined by the claims.

For example the gradual course of bending rigidity may also be obtained in a different manner than with the substantially solid plastic tapering part shown here. For example by arranging the intermediate part as a spring that has increasing radial rigidity, for example a helical spring that has a tapering outside diameter or a tapering wire diameter.

Optionally the inspection head may be provided with a movable arm for pushing the channel tube inspection device from a main tube into a side tube. This movable arm may be brought into contact with the wall of a side tube into which the device is to be moved, or may be pushed off against the wall of the main tube so as to be in a position to change direction in the channel tube while the inspection head is being pushed into the tube.

The invention claimed is:

1. A channel tube inspection device (1) comprising:
an inspection head (3),
a pushing cable (5), and
an elongated intermediate part (7) of which one end (7a) is connected to the inspection head and the other end (7b) is connected to the pushing cable,
wherein the intermediate part (7) comprises elastically bendable portions which have a different elasticity,
wherein the intermediate part (7) possesses a bending rigidity gradually increasing over its length, where the bending rigidity of the intermediate part (7) gradually increasing from the inspection head (3) to the pushing cable (5), and
wherein the intermediate part (7) is substantially solid and has a continuously gradually diminishing diameter from the pushing cable (5) to the inspection head (3).

2. The channel tube inspection device (1) as claimed in claim 1, wherein the intermediate part (7) is made of plastic.

3. The channel tube inspection device (1) as claimed in claim 2, wherein the intermediate part (7) is made of PUR.

4. A channel tube inspection device (1) comprising:
an inspection head (3);
a pushing cable (5);
an elongated intermediate part (7) of a first length, a first end (7a) of the intermediate part (7) having a first diameter and being connected to the inspection head and an opposite, second end (7b) of the intermediate part (7) having a second diameter and being connected to the pushing cable, the first diameter being less than the second diameter,
wherein the intermediate part (7) comprises elastically bendable portions which each have a different elasticity,
wherein the intermediate part (7) possesses a bending rigidity gradually increasing over the length of the intermediate part (7) from the first end to the second end, with the bending rigidity of the intermediate part (7) gradually increasing from the first end at the inspection head (3) to the second end at the pushing cable (5), and
wherein the intermediate part (7) is substantially solid and has a continuously gradually diminishing diameter from second diameter at the second end at the pushing cable (5) to the first diameter at the first end the inspection head (3).

5. The channel tube inspection device (1) as claimed in claim 4, wherein the intermediate part (7) is made of plastic.

6. The channel tube inspection device (1) as claimed in claim 4, wherein the intermediate part (7) is made of PUR.

7. A channel tube inspection device (1) comprising:
an inspection head (3);
a pushing cable (5);
an elongated intermediate part (7) of a first length, a first end (7a) of the intermediate part (7) having a first diameter and being connected to the inspection head and an opposite, second end (7b) of the intermediate part (7) having a second diameter and being connected to the pushing cable, the first diameter being less than the second diameter,
wherein the intermediate part (7) comprises a central opening which extends over the length of the intermediate part,
wherein the intermediate part (7) possesses a bending rigidity gradually increasing over the length of the intermediate part (7) from the first end to the second end, with the bending rigidity of the intermediate part (7) gradually increasing from the first end at the inspection head (3) to the second end at the pushing cable (5), and
wherein the intermediate part (7) has a continuously gradually diminishing diameter from second diameter at the second end at the pushing cable (5) to the first diameter at the first end the inspection head (3); and
cables extending from the inspection head and through the central opening.

8. The channel tube inspection device (1) as claimed in claim 7, wherein the intermediate part (7) is made of plastic.

9. The channel tube inspection device (1) as claimed in claim 7, wherein the intermediate part (7) is made of PUR.

* * * * *